United States Patent [19] [11] 4,147,629
Geurtsen [45] Apr. 3, 1979

[54] APPARATUSES TO SEPARATE A MIXTURE OF LIQUIDS OF DIFFERENT SPECIFIC GRAVITIES, E.G. OIL AND WATER

[75] Inventor: Alfonsus A. Geurtsen, Schalkhaar, Netherlands

[73] Assignee: Machinefabriek Geurtsen Deventer B.V., Deventer, Netherlands

[21] Appl. No.: 817,599

[22] Filed: Jul. 21, 1977

[30] Foreign Application Priority Data

Sep. 1, 1976 [NL] Netherlands ............... 7609743

[51] Int. Cl.² ................. B01D 23/02; B01D 23/26
[52] U.S. Cl. .................................. 210/104; 210/110; 210/115; 210/116; 210/299; 210/315; 210/540
[58] Field of Search ............... 210/104, 110, 115, 116, 210/299, 315, 340, DIG. 5

[56] References Cited

U.S. PATENT DOCUMENTS 3,957,638  5/1976  Vely .................... 210/104
4,032,444  6/1977  Wright et al. ........... 210/115 X Primary Examiner—John Adee
Attorney, Agent, or Firm—John P. Snyder

[57] ABSTRACT

An apparatus to separate a mixture of liquids of different specific gravities, e.g. oil and water, in which in a settling vessel for liquids the buoyancy of the lighter liquid (oil) is used to move a diaphragm upwards to control the discharge of lighter liquid from said vessel and means are provided to check temporarily or to slow down the downward movement of said diaphragm during said discharge.

6 Claims, 1 Drawing Figure

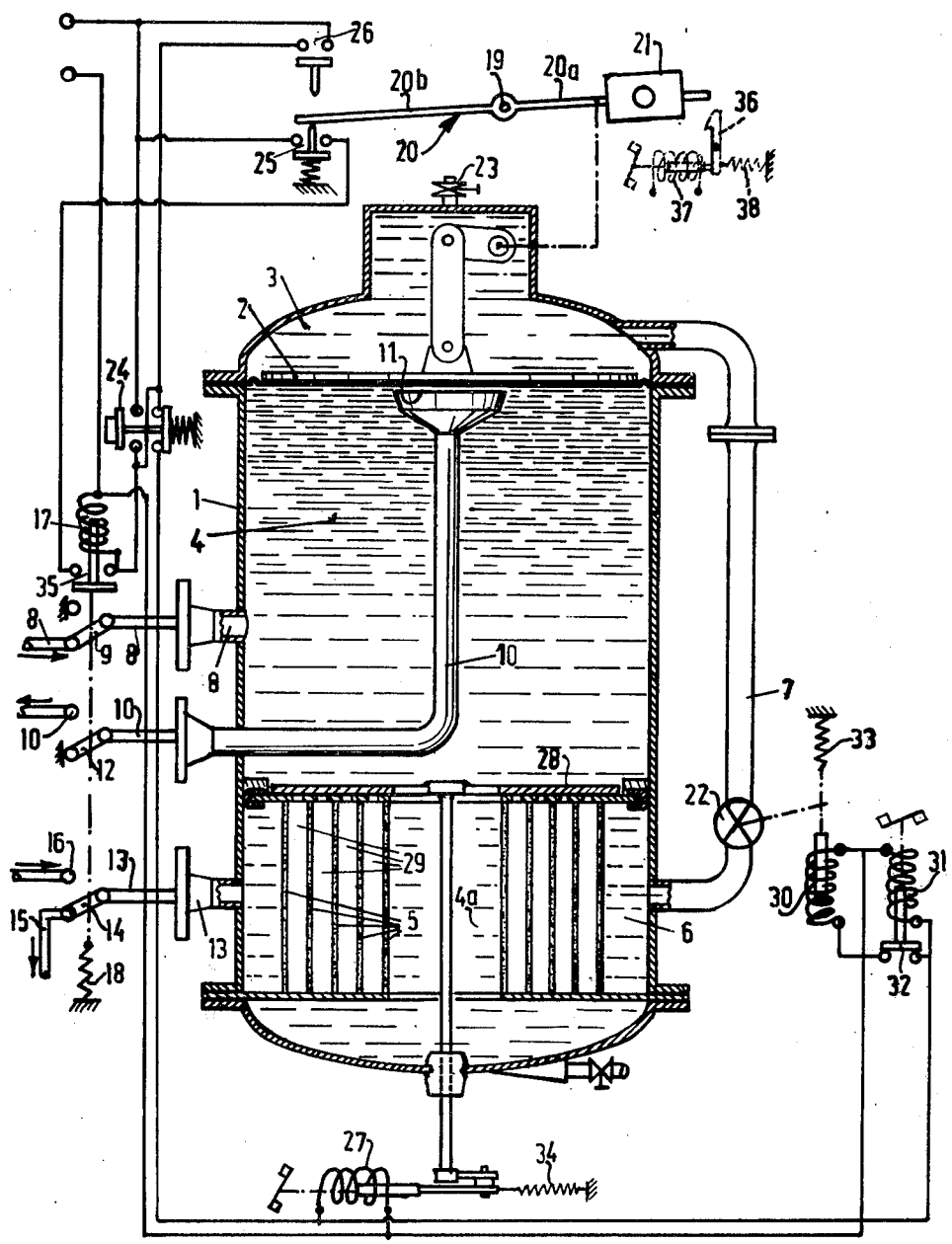

APPARATUSES TO SEPARATE A MIXTURE OF LIQUIDS OF DIFFERENT SPECIFIC GRAVITIES, E.G. OIL AND WATER

The invention relates to an apparatus to separate a mixture of liquids of different specific gravities, e.g. oil and water, said apparatus comprising a closed vessel containing a separation space, an upper chamber situated above the latter and a diaphragm mounted for vertical movement between a lowest and a highest position to control at least the discharge of the lighter liquid, said diaphragm separating the upper end of the separation space from said upper chamber, said vessel being provided with a conduit for the supply of mixture to be separated opening into the separation space and with a conduit for the discharge of the lighter liquid connected to the separation space and provided with a valve which is controlled by the diaphragm, said valve being open, when the diaphragm is in its highest position, and closed, when same is in its lowest position, the vessel containing a collecting chamber for the heavier liquid situated under the separation space and connected to a discharge conduit and at least one filter provided between the lower end of the separation space and said collecting chamber and capable of letting through almost exclusively the heavier liquid, and the apparatus comprising a pipe bypassing the diaphragm and connecting a place contained in the vessel near or under the lower end of the separation space with the upper chamber.

A separating apparatus, e.g. an oil separator, of this construction is known from the Dutch patent application 7402216 laid open to public inspection. Separating apparatuses of this kind operate in this way that, as soon as there has been formed under the diaphragm a layer of lighter liquid (oil) of sufficient thickness, the diaphragm is forced into its highest position and as a result thereof at least a valve provided in a conduit for the discharge of lighter liquid is opened. Due to the opening of this valve and the discharge of lighter liquid, whereby the layer of this liquid under the diaphragm becomes thinner, the upward pressure exerted on the diaphragm decreases. As soon as this pressure has attained a predetermined minimum value, the diaphragm returns to its lowest position and said valve is closed again, after which the cycle of the separation process starts again. Now it has appeared that the opening of said valve, the decrease of the upward force exerted on the diaphragm and the movement of the diaphragm occurring as a result thereof occasionally create a condition in the separation space, in which so much lighter liquid (oil) reaches the immediate environ of the filter that the latter lets through too much lighter liquid and the proportion of the lighter liquid in the heavier liquid (water) discharged from the collection chamber becomes too high. Although this phenomenon appears to occur only at relatively long intervals it may have in periods of given length of time such an unfavourable influence on the effect of the separating apparatus that the latter may not be considered to satisfy anymore the exacting demands made on the separation, for instance the purification of water, say to free it from oil.

The invention has the object to avoid the said disadvantage of the known separating apparatus in a simple manner. The object aimed at is achieved in the provision of means which, during a possibly adjustable interval starting immediately after the opening of the said valve, prevent the diaphragm from moving downwards or slow down the downward movement of the diaphragm. It has been found that, if after the opening of the valve provided in the discharge conduit for the lighter liquid the diaphragm is held a short time, say 10–20 seconds, in its highest position or the speed with which it returns from its highest to its lowest position does not exceed a predetermined value, the fault found in the known separation apparatus does not occur.

To hold the diaphragm in its highest position one may successfully use a second valve which is provided in the bypass and is kept closed only during a possibly adjustable interval startng immediately after the opening of the first valve provided in the conduit for the discharge of lighter liquid from the separation space. If the bypass is closed by the second valve the diaphragm cannot move, since any movement of the diaphragm causes a liquid flow through the bypass.

If it is not desired to hold the diaphragm but should it be convenient to slow down the speed of the diaphragm during its downward movement to a value which is favourable for the separation process, the second valve may be provided with a leak-off passage. This leak-off passage restricts the intensity of the flow of liquid in the bypass and, consequently, the speed of the diaphragm.

The invention will be further elucidated with the aid of the drawing, in which a vertical sectional view of an oil separator constructed according to the invention and provided with electrical regulation is shown.

In the drawing 1 is a closed vessel which is entirely filled with liquid and in which a vertically movable diaphragm 2 is mounted which separates in a liquid and gas tight manner an upper chamber 3 from a separation space 4. Mounted in the vessel 1 below the separation space 4 is a multiple filter 5 which lets through almost exclusively water and, consequently, forms an obstruction to the flow of oil. The filter 5 is mounted between a water collecting chamber 6 and the lower end 4a of the separation space 4. The water collecting chamber 6 is connected with the upper chamber 3 by a bypass 7.

Opening into the separation space 4 is a conduit 8 provided with a valve 9 for the supply of water-oil mixture to be separated. Furthermore, a conduit 10 for the discharge of oil is connected to the separation chamber. The entrance 11 of conduit 10 is found just below the lowest position of the diaphragm 2. Outside the vessel 1 a valve 12 is provided in the conduit 10. Connected to the water collecting chamber 6 is a conduit 13, in which a reversal valve 14 is provided for the connection of conduit 13 either to a water discharge conduit 15 or to a conduit 16 for the supply of water to chamber 6. The valves 9 and 12 and the reversal valve 14 are diagrammatically shown. The water discharge conduit 15 may contain a pump (not shown) which pumps the discharged water into a tank (not illustrated) located at a high level and having an overflow. The water supply conduit 16 may be connected to said high level tank.

The valves 9 and 12 and the reversal valve 14 are simultaneously controlled by an electromagnet 17 and a spring 18. The diaphragm 2 is mechanically coupled with a two-armed lever 20 which is mounted for swinging about an axis 19 and is provided with an adjustable weight 21 on its right hand arm 20a for the decrease of the weight of the diaphragm. However, if the weight of the diaphragm must be increased, the weight 21 is mounted on the left hand arm 20b of lever 20.

In accordance with the invention the bypass 7 is provided with a valve 22, which is open in the illustrated condition of the oil separator.

When the oil separator is put into use first a vent cock 23 is opened. Thereafter a push button 24 is pushed whereby only a magnet coil 17 is energized. As a result thereof the valve 9 in conduit 8 is closed, the valve 12 is opened and conduit 13 is connected to the water supply conduit 16 by the reversal valve 14. The vessel 1 is then entirely filled with water, provided that the supply of water through the conduit 16 is greater than the discharge through the conduit 10. When the vessel 1 is completely filled, the valve 23 is closed and thereupon the push button 24 is released so that the valves 9 and 12 and the reversal valve 14 return to their positions shown in the drawing, after which the separation process sets in. During the filling of the vessel the diaphragm remains in its lowest position.

During the operation of the oil separator mixture of water and oil is supplied through conduit 8 to the separation space 4 and water is discharged from the water collecting chamber 6. In the separation space 4 the lighter oil separates itself from the heavier water, so that under the diaphragm 2 a layer of oil is formed which gradually becomes thicker. After the layer of oil has attained a certain thickness, the upward force exerted on the diaphragm 2 by the liquid contained in the separation space 4 and the spaces occupied by the filter is sufficient to force the diaphragm into its highest position. This has the effect that the micro-switches 25 and 26 are closed. The result thereof is that the magnet coil 17, a magnet coil 27 for the control of a rotatable disk valve 28, which connects the spaces 29 between the filter cloths 5 one after the other with the separation space 4 and thereupon separates them again from said space, a magnet coil 30 for closing the valve 22 and the coil of a time lag relay 31 are energized. This means that the supply of mixture is interrupted, oil is discharged through the conduit 10 and water is supplied through the conduits 16 and 13. This water cleans the filter cloths 5 one after the other and pushes the oil collected in the spaces 29 back into the separation space 4. At the moment water is supplied through the filter 5 and oil is discharged from the separation space the valve 22 is closed, so that the diaphragm 2 cannot move downwards. This is only possible after the time lag relay 31 has opened its contact 32 after an adjusted interval of say 10-20 seconds. When this happens the magnet coil 30 becomes dead so that a spring 33 is capable of returning the valve 22 to its open position. If the valve 22 is opened again, the diaphragm 2 is able to return into its lowest position, as soon as the layer of oil under the diaphragm has become too thin to carry the diaphragm. Due to the fact that the diaphragm is held a certain time after the opening of the oil discharge conduit 10, it is avoided that the diaphragm starts to move hesitatingly, turbulences occur in the separation space and as a result thereof oil drops, which often have weights differing very little from that of the water replaced by them are pushed to the space 4a in front of the multiple filter 5. Thereby the filter could be loaded too much and the proportion of oil in the discharged water could be increased a short time to an inadmissible value.

As soon as the diaphragm has left its highest position the contact 26 is opened. Owing thereto the coils 27 and 31 become dead. Then at least the relay 31 returns with sufficient delay to the position of rest, in which the contact 32 is closed, to prevent the magnet coil 30 of being energized again, whereby the valve 22 would be closed again and, consequently, the diaphragm 2 would be checked in its downward movement, before the diaphragm has reached its lowest position and in that position has opened the contact 25. After its excitation the magnet coil 27 rotates the disk valve 28 so slowly, that during the discharge of oil all filter cloths 5 and intermediate spaces 29 are successively cleaned by the water supplied through the conduit 16 during a sufficiently long time. Thereafter the disk valve 28 is quickly pulled back to its position of rest by the spring 34. When the contact 25 is opened, the magnet coil 17 which remained energized through the holding contact 35 becomes dead, so that the spring 18 is capable of pulling the valves 9 and 12 and the reversal valve 14 back into the shown positions. The separating cycle then starts again, so that the thickness of the layer of oil under the diaphragm 2 increases again.

It will be obvious, that many variations of the electrical circuits to control the separation process are possible. This control may be carried out instead of electrically, pneumatically, electro-pneumatically, hydraulically, electro-hydraulically and/or mechanically.

Although holding the diaphragm in its highest position by means of the valve 22 provided in the bypass is very simple, it is also possible to use for that purpose electro-mechanical means or still other means. For instance, the arm 20a of lever 20 may be caught in its lowest position, that means in the highest position of the diaphragm 2, by the catch 36 shown in dotted lines. This catch may then be released after a certain interval by a magnet coil 37 operating with time lag. In that case the latter magnet coil and its spring 38 will replace the magnet coil 30, the spring 33 and the time lag relay 31, 32 shown in the electrical diagramm of the drawing.

It is observed, that in some cases the valve 22, e.g. a butterfly valve, may be provided with a leak-off opening. In that case the diaphragm is not held during a certain time in its highest position but its downward movement is considerably slowed down during that time.

What I claim is:

1. An apparatus to separate a mixture of liquids of different specific gravities, e.g. oil and water, said apparatus comprising a closed vessel, a separation space, an upper chamber situated above said space, said space and said chamber being both contained in the vessel, a diaphragm mounted for vertical movement between a lowest and a highest position for controlling at least the discharge of the lighter liquid, said diaphragm forming a liquid tight partition between the upper end of the separation space and the upper chamber, a conduit for the supply of mixture to be separated, said conduit opening into the separation space, a conduit for the discharge of the lighter liquid, the latter conduit having its entrance within the separation space on a level just below the lowest position of the diaphragm, a valve provided in said discharge conduit and being controlled by the diaphragm, said valve being open, when the diaphragm is in its highest position, and closed when the diaphragm is in its lowest position, a collecting chamber for the heavier liquid, said collecting chamber being contained in the vessel under the separation space, a conduit for the discharge of heavier liquid, the latter discharge conduit being connected to the collecting chamber, at least one filter provided in the vessel between the lower end of the separation space and the collecting chamber and capable of letting through almost exclusively the heavier liquid and retaining almost completely the lighter liquid, a pipe bridging the diaphragm and connecting the upper chamber with a place located in the vessel near or below the lower end of the separation space and communicating with the latter space, a second valve which is provided in the pipe bridging the diaphragm and means to control said second valve so as to close it immediately after the opening of the valve provided in the conduit for the discharge of lighter liquid from the separation space and to keep it closed a predetermined interval during the discharge of lighter liquid from the vessel.

2. An apparatus as claimed in claim 1, in which a leak-off passage is provided in said second valve, said passage allowing the diaphragm to move downward with a slowed down speed during the interval, in which the second valve is closed.

3. An apparatus to separate a mixture of liquids of different specific gravities, e.g. oil and water, said apparatus comprising a closed vessel, a separation space, an upper chamber situated above said space, said space and said chamber being both contained in the vessel, a diaphragm mounted for vertical movement between a lowest and a highest position for controlling at least the discharge of the lighter liquid, said diaphragm forming a liquid tight partition between the upper end of the separation space and the upper chamber, a conduit for the supply of mixture to be separated, said conduit opening into the separation space, a conduit for the discharge of the lighter liquid, the latter conduit having its entrance within the separation space on a level just below the lowest position of the diaphragm, a valve provided in said discharge conduit and being controlled by the diaphragm, said valve being open, when the diaphragm is in its highest position, and closed, when the diaphragm is in its lowest position, a collecting chamber for the heavier liquid, said collecting chamber being contained in the vessel under the separation space, a conduit for the discharge of heavier liquid, the latter discharge conduit being connected to the collecting chamber, at least one filter provided in the vessel between the lower end of the separation space and the collecting chamber and capable of letting through almost exclusively the heavier liquid and retaining almost completely the lighter liquid, a pipe bridging the diaphragm and connecting the upper chamber with a place located in the vessel near or below the lower end of the separation space and communicating with the latter space, a movable member which is positively coupled with the diaphragm, a catch for holding said movable member in its position corresponding with the highest position of the diaphragm and means to release said catch a predetermined time after the diaphragm has reached its highest position and the discharge of lighter liquid from the vessel has started.

4. Apparatus for separating a mixture of liquids of different specific gravities, e.g. oil and water, comprising in combination:

a closed vessel having a horizontal partition in the form of a flexible diaphragm dividing the interior of the vessel into an upper chamber above the diaphragm and a separating space below the diaphragm, and filter means for allowing the heavier liquid to pass preferentially therethrough from a lower region of said separating space into a collecting space;

first conduit means communicating with separating space for supplying the mixture to be separated and second conduit means communicating with said collecting space for withdrawing the heavier liquid while the mixture is being supplied by said first conduit means, whereby the lighter liquid tends to rise and collect beneath said diaphragm while the heavier liquid passes through said filter means to said collecting space and out through said second conduit means;

by-pass conduit means communicating said upper chamber with said collecting space for allowing the heavier liquid to pass back and forth therebetween to accommodate vertical motion of said diaphragm;

third conduit means having an inlet opening disposed just below the lowest position of said diaphragm for allowing discharge of the lighter liquid which has accumulated beneath the diaphragm, said third conduit means including a normally closed valve;

means responsive to movement of said diaphragm to an uppermost position for opening said normally closed valve whereby the accumulated lighter liguid is withdrawn to allow the diaphragm to descend from such uppermost position; and means for delaying such descent of the diaphragm for a predetermined time immediately subsequent to the opening of said normally closed valve.

5. Apparatus as defined in claim 4 wherein said means for delaying comprises a normally open valve in said by-pass conduit means and means for temporarily closing said normally open valve in response to movement of said diaphragm to said uppermost portion.

6. Apparatus as defined in claim 4 wherein said means for delaying comprises linkage means for retaining said diaphragm temporarily in said uppermost position.

* * * * *